Nov. 16, 1965     O. C. MOLEN     3,218,208
METHODS OF APPLYING DECORATIVE STRIPS TO TIRE SIDEWALLS
Filed Oct. 7, 1963     2 Sheets-Sheet 1

INVENTOR.
ORBIN C. MOLEN
BY
Fryer + Tjensvold
ATTORNEYS

Nov. 16, 1965  O. C. MOLEN  3,218,208
METHODS OF APPLYING DECORATIVE STRIPS TO TIRE SIDEWALLS
Filed Oct. 7, 1963  2 Sheets-Sheet 2

INVENTOR.
ORBIN C. MOLEN
BY
Fryer + Tjensvold
ATTORNEYS

3,218,208
METHODS OF APPLYING DECORATIVE STRIPS TO TIRE SIDEWALLS
Orbin C. Molen, 1124 Highway 99W, Orland, Calif.
Filed Oct. 7, 1963, Ser. No. 315,429
8 Claims. (Cl. 156—116)

The present invention relates to methods and apparatus for adding decorative strips to the sidewalls of tires. The present invention has particular application to the addition of a whitewall strip to black sidewalls and to the conversion of wide width white sidewalls to narrow width white sidewalls when the tire is recapped.

The present application is a continuation-in-part of copending application Serial No. 292,854, filed July 5, 1963.

Most of the tires presently available for recapping have either an all black sidewall or a wide width white sidewall. Because of the present popularity of the narrow width white sidewalls on the new tires now being made by the major tire manufacturers, there is little demand for recapped black sidewall tires or recapped tires having the older wide width white sidewalls.

It is a primary object of the present invention to vulcanize a narrow width strip in a sidewall of the tire to add the presently popular narrow width white strip to the sidewall of an all black tire or, by inlaying a black strip in a groove cut in a wide width white sidewall, to convert a wide width white sidewall to a sidewall having one or more narrow width white strips. It is a related object to inlay and vulcanize the strip in the sidewall in a manner which permits a single, smoothly curved pressure plate free of beads and grooves to be used for any one of a variety of sidewall designs.

In accordance with the present invention a groove is cut in the cured sidewall of the tire with the sides of the groove disposed substantially normal to the surface of the sidewall. An uncured rubber strip, which can be colored white or black or any color desired, is then inlaid in the groove. The uncured rubber strip has a width substantially equal to the width of the groove and has a thickness just slightly greater than the depth of the groove. The uncured strip and the cured sidewall are then pressed against a smoothly curved surface of a pressure plate in a heated matrix to compress the uncured strip within the groove during the vulcanization process. The sharply defined sides of the groove in the cured sidewall act as mold boundaries to produce distinctly formed lines of demarcation at the inner and outer peripheries of the strip, and the strip is vulcanized flush with the sidewall.

It is an important feature of the present invention that the sides of the groove be sharply defined to permit these sides to act as mold boundaries for the uncured rubber strip so that the decorative strip can be added in a single vulcanizing operation and without the need to resort to auxiliary stops or guides in the matrix. This not only reduces the number of operations and therefore the cost in the vulcanizing process but also permits a single pressure element to be used for producing any of the tire sidewall designs of the present invention.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

Figures 9, 10:
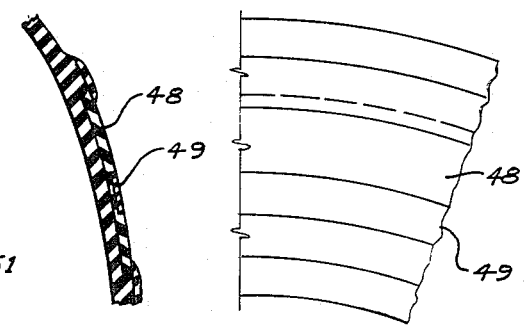
Figures 11, 12:
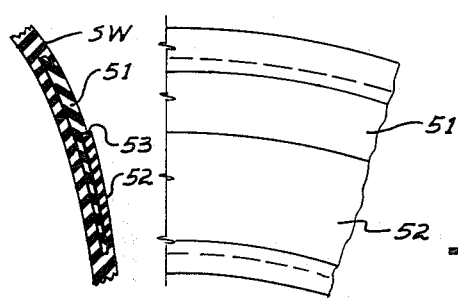

FIGS. 9 and 10 are fragmentary cross-sectional and side elevation views, respectively, of a portion of a tire sidewall having a wide width white sidewall strip incorporated in the tire as originally produced and showing a black strip inlaid and vulcanized in the whitewall strip to divide the wide width whitewall strip into two narrow width whitewall strips; and FIGS. 11 and 12 are fragmentary cross-sectional and elevation views respectively of a portion of a tire sidewall having a wide width white sidewall strip incorporated in the tire as originally produced and showing a black sidewall strip inlaid and vulcanized in the white sidewall in the lower portion thereof to convert the wide width white strip to a narrow width white strip.

Figure 1:
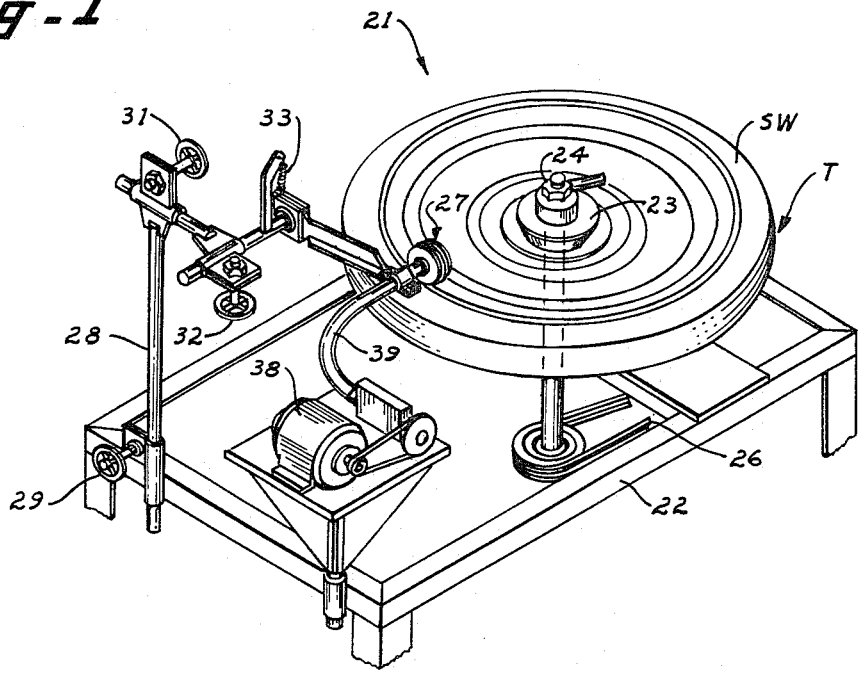
FIG. 1 is a perspective view of a machine for cutting a fixed depth groove in a tire sidewall in accordance with the present invention.

In FIG. 1 a machine for cutting a fixed depth groove in the sidewall of the tire and constructed in accordance with one embodiment of the invention is indicated generally by the reference numeral 21. The machine 21 includes a fixed frame 22 which supports a turntable for rotating the tire T about its axis. The tire T is held in position by a centering cone 23 and locking nut 24. The turntable is rotated by V-belts 26 as illustrated, or by any other suitable drive arrangement.

Figure 2:
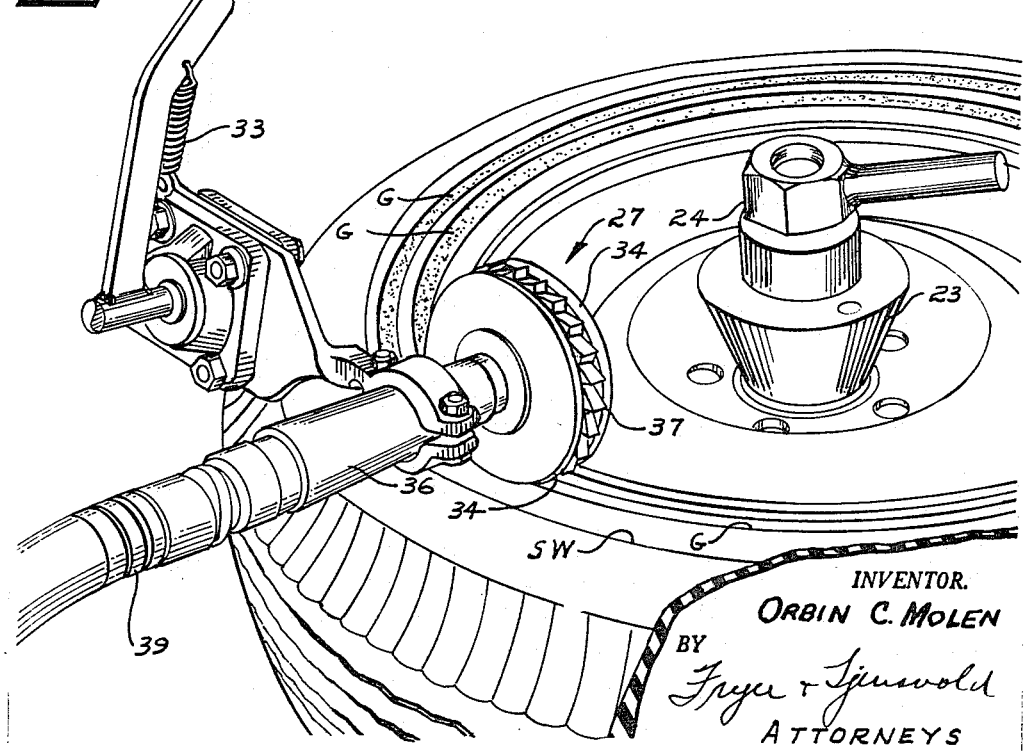
FIG. 2 is an enlarged, fragmentary view showing details of construction of the cutter head incorporated in the machine shown in FIG. 1.

A cutter head 27, shown in greater detail in FIG. 2, is mounted on the end of an adjustable stand 28 for engagement with the tire sidewall SW. The stand 28 includes positioning means in the form of clamps 29, 31 and 32 for adjusting the vertical and horizontal positions and the angular inclination of the cutter head 27.

A tension spring 33 serves to bias the cutter head toward the sidewall SW.

As best viewed in FIG. 2, the cutter head 27 includes a pair of wheels 34 mounted for free rotation on a tubular shaft 36. A rotary cutter 37 is disposed between the wheels 34 and has teeth projecting radially outwardly of the outer periphery of the wheels 34 as illustrated. The rotary cutter 37 is driven by an electric motor 38, see FIG. 1, through a flexible shaft enclosed within a flexible conduit 39.

In the operation of the machine 21, the rims of the wheels 34 engage the tire sidewall SW, as the tire T is rotated beneath the cutter head 27 by the turntable, to limit the depth of the groove or grooves G cut in the tire sidewall.

The cutter 37 produces sharply defined sides in the groove which extend parallel to one another and substantially normal to the surface of the sidewall SW. This is a very important feature of the present invention since such sharply defined sides minimize the formation of feather edges when an uncured strip is vulcanized in the groove G in the manner to be described in greater detail hereinbelow.

It will be apparent that one or more cutter heads 27 may be mounted on the shaft 36 and the width of the groove G can be varied by inserting wider or narrower cutters 37 between the wheels 34.

Once a groove has been cut in the sidewall by the machine 21 in the manner described above, an uncured rubber strip is inlaid in the groove. The strip has a width substantially equal to the width of the groove and has a thickness just slightly greater than the depth of the groove to insure that pressure is applied to the uncured strip by the pressure plate during vulcanization.

Figure 3:
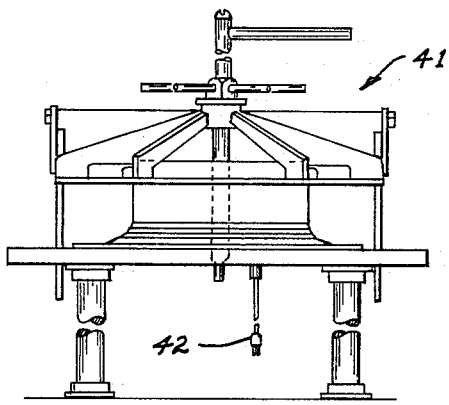
FIG. 3 is an elevation view of vulcanizing equipment used for practicing the method of the present invention.
Figure 4:
FIG. 4 is a sectional view of a pressure plate used in the vulcanizer shown in FIG. 3.

The tire with the uncured strip in place is then positioned in conventional vulcanizing apparatus 41 as illustrated in FIG. 3. In the vulcanizing apparatus shown in FIG. 3 the necessary heat for vulcanization is electrically supplied through a power cord 42. In the matrix of the vulcanizing apparatus 41 the sidewall and uncured strip are pressed against the smooth upper surface of a pressure plate 43 as illustrated in FIG. 4.

It is another important feature of the present invention that the single pressure plate 43 may be used to produce any one of the variety of sidewall designs described in greater detail hereinbelow. Only a single vulcanizing operation is necessary to produce the decorative sidewall of the present invention, and no specially configured pressure plates are required for any particular one of the designs. The pressure plate, in coaction with the sharply cut sidewalls of the groove G in the cured sidewall, produces a decorative sidewall in which the added strip is disposed flush with the remainder of the sidewall and wherein the entire radial extent of the strip is visible with the inner and outer edges of the strip sharply defined in the sidewalls by areas of junction disposed substantially normal to the surface of the sidewall.

Figures 5, 6:
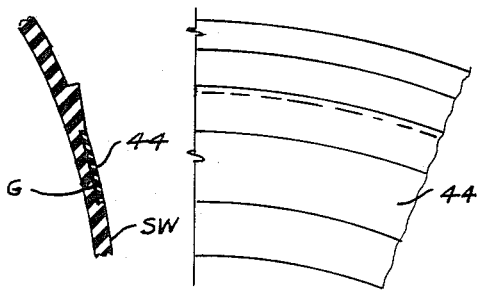
FIGS. 5 and 6 are fragmentary cross-sectional and side elevation views, respectively, of a black sidewall tire having a white sidewall strip inlaid and vulcanized therein in accordance with one embodiment of the present invention.

In FIGS. 5 through 12, four examples of products produced in accordance with the present invention are illustrated. Referring first to FIGS. 5 and 6, a white strip 44 is shown vulcanized in a black sidewall SW. As noted above, the strip 44 is disposed flush with the surface of the sidewall SW and the demarcation between the inner and outer edges of the strip 44 and the rest of the sidewall SW is sharply defined at the corresponding sides of the groove G. No additional stoning or grinding of the edges of the strip 44 is required to produce the desired definition. The entire sidewall SW may, however, be lightly buffed to remove any loose particles of rubber normally produced by vulcanization.

Figures 7, 8:
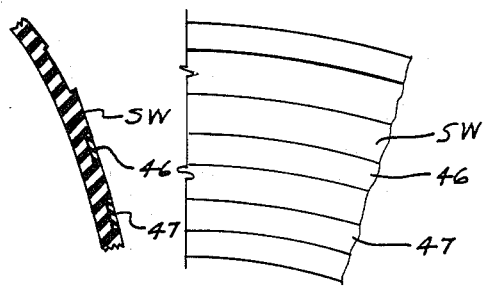
FIGS. 7 and 8 are fragmentary cross-sectional and side elevation views, respectively, of a portion of the sidewall of a black sidewall tire having two white sidewall strips inlaid and vulcanized therein.

FIGS. 7 and 8 show two concentric white strips 46 and 47 vulcanized in an all black sidewall SW. A plurality of strips such as 46 and 47 can be inlaid in the sidewall SW using the same pressure plate 43 as used to vulcanize the single strip 44 illustrated in FIGS. 5 and 6. The sharply defined sides of the grooves G in the cured rubber sidewall SW are effective to produce the definition desired without corresponding stops on the pressure plate 43 or the need to stone or buff the strips to produce the line of demarcation after the vulcanizing process.

A wide width white sidewall strip 48 may be converted to the more popular narrow width white sidewall strip by dividing the strip 48 into two concentric strips by means of a black strip 49 in the manner shown in FIGS. 9 and 10.

Alternatively, the wide width white sidewall strip may be converted to a narrow width white sidewall strip in the manner shown in FIGS. 11 and 12. In this case the whitewall strip 51 has a groove cut therein so that the inner side of the groove is disposed in the black portion of the sidewall SW. A black strip 52 is then vulcanized in the groove in the manner described above. As illustrated in FIG. 11, a laterally extending shoulder 53 may be formed at the juncture of the strip 52 and strip 51 by stoning down the strip 51 after vulcanization is completed. This laterally extending shoulder simulates the appearance of narrow width white sidewalls as presently incorporated in new tires produced by tire manufacturers.

Thus, in accordance with the present invention decorative strips may be vulcanized in tire sidewalls by a process which requires but a single vulcanizing operation and by a single pressure plate which can be used for any one of a variety of tire sidewall patterns. The process of the present invention, by cutting a precisely formed groove in the cured rubber sidewall, makes use of the existing cured rubber sidewall to produce a vulcanized product having sharp edge definition without the need for special mold equipment.

The methods described above all incorporate vulcanization of an uncured rubber strip to the groove in the cured tire sidewall through the application of heat in vulcanizing apparatus. In accordance with the present invention the pigmented strip may also be incorporated in the tire sidewall in other ways.

For example, the pigmented strip, white or black or other color, can be bonded in the groove by chemically vulcanizing a suitable material to the tire sidewall without heating the tire in a matrix. A pigmented rubberoid resin can be applied to the groove and polymerized to chemically cross link the pigmented resin and the rubber in the tire sidewall. In this case it is generally desirable to subsequently dress the tire sidewall after the chemical vulcanization has been completed to accentuate the desired sharp line between the colored strip and the sidewall.

Once the sharply defined fixed depth groove has been cut in the tire sidewall the desired contrasting color for the decorative strip can also be afforded by bonding other pigmented material in the groove. Rubber cement of the desired color may be applied once the groove has been cut. Depending upon the specific striping material selected, it may be necessary to use a conventional chemical activator to achieve the desired adherence between the striping material and the side and bottom of the groove.

In the case of adding a black stripe to white sidewalls, it has been found that satisfactory results can in some cases be produced by applying a black dye to the groove formed in the white sidewall.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of applying a colored strip to a cured sidewall of a tire comprising milling a fixed depth groove with sharply defined sides in the cured sidewall of the tire by means of cutting apparatus having both a cutter effective to cut the sidewall sharply enough to prevent burning and to thereby permit subsequent vulcanization of an uncured decorative rubber strip in the sidewall and positioning means effective to limit the depth of the cut and to produce a precise circular groove with sidewalls sufficiently sharply defined to serve as mold boundaries, inlaying in the groove an uncured rubber strip having a width substantially equal to the width of the groove and having a thickness just slightly greater than the depth of the groove, pressing the sidewall and strip against a smooth surface of a heated matrix and using the sharply defined sides of the groove in the cured sidewall as mold boundaries to vulcanize the strip flush to the sidewall with distinctly formed lines of demarcation at the inner and outer peripheries of the strip.

2. A method as defined in claim 1 including cutting the sides of the groove normal to the surface of the sidewall to provide mold boundaries which minimize the formation of feather edges at the junctures of the strip and sidewall.

3. A method as defined in claim 1 in which a plurality of radially spaced grooves are cut concentric about the sidewall for the reception of an equal number of uncured rubber strips and wherein the matrix includes a smoothly curved pressure plate free of grooves and ridges in the area engaged with the sidewall.

4. A method of converting a wide width white sidewall tire to a white sidewall having two narrow width white strips separated by a black strip comprising milling a fixed depth groove with sharply defined sides in the cured white sidewall with the sides of the groove disposed normal to the surface of the sidewall by means of a rotary toothed cutting wheel, inlaying in the groove a black uncured rubber strip having a width substantially equal to the width of the groove and having a thickness just slightly greater than the depth of the groove, pressing the sidewall and strip against a heated matrix having a smoothly curved surface free of grooves and ridges and using the sharply defined sides of the groove in the cured sidewall as mold boundaries to vulcanize the black strip flush to the sidewall with distinctly formed lines of demarcation at the inner and outer peripheries of the black strip and the adjoining narrow width white sidewall strips.

5. A machine for cutting a fixed depth groove in a cured sidewall of a tire preparatory to vulcanizing a decorative strip in the groove cut in the sidewall and comprising a turntable for rotating the tire about its axis, a cutter head having two wheels mounted for free rotation on a shaft and a rotary cutter disposed between the wheels with teeth projecting radially outwardly of the outer periphery of the wheels so that the wheels engage the surface of the sidewall to limit the depth of cut as the cutter head rolls along the sidewall, positioning means for adjusting the vertical and horizontal positions and the angular inclination of the axis of rotation of the cutter head, drive means for rotating the cutter, and biasing means for maintaining the wheels in engagement with the sidewall of the tire.

6. A machine as defined in claim 5 in which the cutter teeth are shaped to cut parallel sides of the groove substantially normal to the surface of the sidewall.

7. A machine as defined in claim 5 in which said drive means include a flexible drive shaft for rotating the cutter in varied positions and inclinations of the cutter head.

8. A method of applying a colored strip to the sidewall of a tire comprising cutting a fixed depth groove with sharply defined sides in a cured sidewall of a tire by means of a cutter head having two wheels mounted for free rotation on a shaft and a rotary toothed cutter disposed between the wheels with teeth projecting radially outwardly of the outer periphery of the wheels so that the wheels engage the surface of the sidewall to limit the depth of cut as the cutter head rolls along the sidewall, inlaying in the groove an uncured rubber strip having a width substantially equal to the width of the groove and having a thickness just slightly greater than the depth of the groove, pressing the sidewall and strip against a smooth surface of a heated matrix and using the sharply defined sides of the groove in the cured sidewall as mold boundaries to vulcanize the strip flush with the sidewall with distinctly formed lines of demarcation at the inner and outer peripheries of the strip.

References Cited by the Examiner

UNITED STATES PATENTS

| 1,260,125 | 3/1918 | Aurand | 90—12 |
| 1,956,331 | 4/1934 | Mullin | 157—13 |
| 2,303,463 | 1/1946 | Gottlieb | 106—109 |
| 2,432,753 | 12/1947 | Griffin | 90—12 |
| 2,566,329 | 9/1951 | Hessney et al. | 156—116 X |
| 2,670,526 | 3/1954 | Rawls | 157—13 |
| 2,672,651 | 3/1954 | Smyser | 18—18 |
| 2,746,515 | 5/1956 | Usack | 156—116 |
| 2,810,238 | 10/1957 | Yoho et al. | 157—13 |
| 3,001,334 | 9/1961 | Giusti et al. | 157—13 X |
| 3,128,579 | 4/1964 | Kehoe et al. | 157—13 X |

FOREIGN PATENTS 207,862   8/1956   Australia.

OTHER REFERENCES

Firestone Retread Shop Manual, p. F-6, dated January 7, 1954.

EARL M. BERGERT, *Primary Examiner.*